(12) United States Patent
Moon et al.

(10) Patent No.: US 10,039,414 B2
(45) Date of Patent: Aug. 7, 2018

(54) BEVERAGE MACHINE WITH ROTATABLE BREW CHAMBER

(71) Applicant: CLOVER CO., LTD., Anyang (KR)

(72) Inventors: Il Mook Moon, Gwacheon (KR); Sun Bae Hong, Gunpo (KR); Young Wook Kim, Gwangju-si (KR)

(73) Assignee: CLOVER CO., LTD., Anyang, Gyeongi-Do (KR)

( * ) Notice: Subject to any disclaimer, the term of this patent is extended or adjusted under 35 U.S.C. 154(b) by 568 days.

(21) Appl. No.: 14/539,384

(22) Filed: Nov. 12, 2014

(65) Prior Publication Data

US 2015/0335197 A1  Nov. 26, 2015

(30) Foreign Application Priority Data

May 21, 2014  (KR) ........................ 10-2014-0060830

(51) Int. Cl.
*A47J 31/46* (2006.01)
*A47J 31/40* (2006.01)
*A47J 31/36* (2006.01)

(52) U.S. Cl.
CPC ......... *A47J 31/462* (2013.01); *A47J 31/3633* (2013.01); *A47J 31/407* (2013.01)

(58) Field of Classification Search
CPC .. A47J 31/52; A47J 31/56; A47J 31/42; A47J 31/007; A47J 31/0573
USPC ........ 426/115, 431, 433; 99/280, 285, 323.2
See application file for complete search history.

(56) References Cited

U.S. PATENT DOCUMENTS

| | | | |
|---|---|---|---|
| 4,944,217 A | 7/1990 | Watanabe | |
| 5,454,293 A | 10/1995 | Santi | |
| 5,901,636 A | 5/1999 | Witziers et al. | |
| 6,112,946 A * | 9/2000 | Bennett ............... | B67D 1/0009 222/1 |
| 6,490,966 B2 | 12/2002 | Mariller et al. | |
| 6,698,332 B2 | 3/2004 | Kollep et al. | |
| 6,789,461 B1 | 9/2004 | Huang et al. | |
| 6,857,353 B2 | 2/2005 | Kollep et al. | |
| 7,032,502 B2 | 4/2006 | Chan et al. | |
| 7,216,582 B2 | 5/2007 | Yoakim et al. | |
| 7,347,138 B2 | 3/2008 | Bragg et al. | |
| 7,398,726 B2 | 7/2008 | Streeter et al. | |
| 7,415,921 B2 | 8/2008 | Brouwer | |
| 7,481,151 B2 | 1/2009 | Van Der Meer et al. | |
| 7,523,695 B2 | 4/2009 | Streeter et al. | |
| 7,600,467 B2 | 10/2009 | Coccia et al. | |
| 7,644,649 B2 | 1/2010 | Dworzak et al. | |
| 7,644,650 B2 | 1/2010 | Suzuki | |

(Continued)

*Primary Examiner* — Tu B Hoang
*Assistant Examiner* — Thomas Ward
(74) *Attorney, Agent, or Firm* — Revolution IP, PLLC

(57) ABSTRACT

The present invention relates to a beverage machine with a rotatable brew chamber, and more particularly, to a beverage machine with a rotatable brew chamber wherein the brew chamber is moved upwardly and downwardly and rotated forwardly and backwardly by means of an operation of a lever and high pressure air is supplied to a water outlet pipe connecting a temperature conversion tank and the brew chamber with each other, thus completely discharging the liquid remaining in the water outlet pipe. According to the present invention, the brew chamber can be open or closed by means of one time operation of the lever, thus allowing a cartridge to be easily detachably mounted therein.

10 Claims, 15 Drawing Sheets

(56) References Cited

U.S. PATENT DOCUMENTS

| | | |
|---|---|---|
| 7,677,158 B2 | 3/2010 | McDuffie et al. |
| 7,819,284 B2 | 10/2010 | Hale |
| 8,074,560 B2 | 12/2011 | Levi et al. |
| 8,151,694 B2 | 4/2012 | Jacobs et al. |
| 8,387,516 B1 | 3/2013 | Reynolds |
| 8,495,949 B2 * | 7/2013 | Tinkler .................. A47J 31/32 99/280 |
| 8,516,948 B2 * | 8/2013 | Zimmerman ........... A47J 31/32 426/433 |
| 8,640,605 B2 | 2/2014 | Hart |
| 8,701,547 B2 | 4/2014 | Leung et al. |
| 2006/0090653 A1 | 5/2006 | McDuffie et al. |
| 2006/0174773 A1 | 8/2006 | Taylor |
| 2008/0041234 A1 | 2/2008 | Cortese |
| 2008/0121111 A1 | 5/2008 | Paget et al. |
| 2010/0112165 A1 | 5/2010 | Masciandaro et al. |
| 2011/0197771 A1 | 8/2011 | Bolzicco et al. |
| 2011/0259201 A1 | 10/2011 | Mograbi |
| 2013/0004629 A1 | 1/2013 | Clark et al. |
| 2013/0032036 A1 | 2/2013 | Zhong et al. |
| 2013/0183130 A1 | 7/2013 | Etter |
| 2013/0209636 A1 * | 8/2013 | Cominelli ............... A47J 31/46 426/431 |
| 2013/0223965 A1 | 8/2013 | Choi et al. |
| 2014/0060335 A1 | 3/2014 | Sachtleben |
| 2014/0069281 A1 | 3/2014 | Ryser et al. |
| 2014/0102310 A1 | 4/2014 | Aardenburg et al. |

\* cited by examiner

BEVERAGE MACHINE WITH ROTATABLE BREW CHAMBER

BACKGROUND OF THE INVENTION

Field of the Invention

The present invention relates to a beverage machine with a rotatable brew chamber, and more particularly, to a beverage machine with a rotatable brew chamber wherein the brew chamber is moved upwardly and downwardly and rotated forwardly and backwardly by means of an operation of a lever and high pressure air is supplied to a water outlet pipe connecting a temperature conversion tank and the brew chamber with each other, thus completely discharging the liquid remaining in the water outlet pipe.

Background of the Related Art

A capsule type coffee machine, which has been much sold recently in a market, is configured to insert a capsule, pod, a pack or the like in which coffee beans or milk is contained into a tray of a water outlet portion, to supply high temperature and high pressure water to the interior of the capsule through a brew chamber, and to provide the coffee beverage discharged therefrom for a user.

The coffee machine has a storage tank in which water having a room temperature is stored and a temperature conversion tank in which the water supplied from the storage tank is heated and stored therein. The water discharged from the temperature conversion tank is supplied to the interior of the capsule mounted in the brew chamber.

So as to mount the capsule into the brew chamber, the tray or container should be exposed to the outside. Generally, in the state wherein the tray capable of being drawn like a drawer is completely separated from the coffee machine, the capsule is put into the tray, and next, the tray is fitted to the interior of the brew chamber of the coffee machine.

Recently, a coffee machine having the brew chamber rotated and moved at the same time by means of a container rotated by one operation has been proposed.

FIGS. 1a to 1d are sectional views showing the procedure for opening/closing a brew chamber of a coffee machine in the conventional practice.

The conventional coffee machine has a housing adapted to support the parts mounted at the inside thereof, and generally, the brew chamber is located at the front surface of the upper end portion of the housing.

A container 20 into which a capsule is accommodated is rotatably fixed to the housing. The top portion of the container 20 is closed by means of a cap 22, and the cap 22 is rotatably fixed to the housing.

The container 20 is rotated between a vertical position (closed state) closed by the cap 22 and a forwardly inclined position (open state). The container 20 is reciprocated between the vertical position and the inclined position around first rotating axis A1 connected to the housing.

If the container 20 is rotated and located to the inclined position, the open top surface of the container 20 is exposed forwardly, and thus, the capsule can be inserted or drawn.

Further, the cap 22 is rotated with respect to the housing around second rotating axis A2, and if the cap 22 is moved downwardly, it comes into contact with the open top surface of the container 20. At this time, the container 20 becomes closed. Further, if the cap 22 is rotated upwardly and distant from the container 20, the container 20 becomes open.

The operations of the container 20 and the cap 22 are performed by means of one lever 40, and as the lever 40 pulls or pushes, that is, protrusions 36 moving along guide grooves 38 formed on the container 20 guide the rotation of the container 20 and the downward movement of the cap 22.

In the state where the container 20 is completely open, if the lever 40 is moved down forwardly, the container 20 is rotated to the closed position and at the same time the cap 22 is rotated downwardly and moved down.

In the state where the container 20 completely stands up, the cap 22 is moved down along the guide grooves 38, so that the container 20 and the cap 22 are brought into close contact with each other, thus making the brew chamber closed.

So as to perform the above-mentioned operations, by the way, the container 20 and the cap 22 should be connected to the housing by means of their respective rotating shafts. However, the cap 22 generally has a water inlet nozzle from which water is supplied, and a water outlet pipe from which hot water is supplied is connected to the water inlet nozzle. If the water inlet nozzle connected to the water outlet pipe is moved together with the operation of the cap 22, the internal structure becomes complicated, and since the sharp water inlet nozzle attached to the cap 22 is exposed to the outside, it may cut a user's finger. Further, the user's finger may be caught between the cap and the container.

SUMMARY OF THE INVENTION

Accordingly, the present invention has been made in view of the above-mentioned problems occurring in the prior art, and it is an object of the present invention to provide a beverage machine with a rotatable brew chamber that prevents a sharp object like a water outlet nozzle from being exposed to the outside.

It is another object of the present invention to provide a beverage machine with a rotatable brew chamber wherein a container in which a cartridge is mounted is moved between a closing state contacted with a chamber body and an open state separated from the chamber body, while being moved upwardly and downwardly and rotated forwardly and backwardly with a given range.

It is yet another object of the present invention to provide a beverage machine with a rotatable brew chamber wherein guide protrusions are slidingly moved along guide grooves formed on a container, so that the container is moved upwardly and downwardly and rotated forwardly and backwardly with a given range by means of an operation of a lever.

It is still another object of the present invention to provide a beverage machine with a rotatable brew chamber wherein the liquid of a temperature conversion tank is moved by means of a water pump mounted on a water outlet pipe, and the water outlet pipe is extended to an appropriate level of liquid in the interior of the temperature conversion tank, so that when the water pump is operated to lower the level of the liquid of the temperature conversion tank, air is not absorbed in the water pump.

It is yet still another object of the present invention to provide a beverage machine with a rotatable brew chamber that is capable of removing the liquid remaining in a water outlet pipe by means of high pressure air after beverage brewing is finished.

To accomplish the above-mentioned objects, according to the present invention, there is provided a beverage machine for brewing a beverage by supplying liquid to a cartridge in which a material for the beverage is contained, the beverage machine including: a storage tank storing the liquid therein; a temperature conversion tank storing the liquid supplied from the storage tank therein; a brew chamber mounting the cartridge thereinto and moved upwardly and downwardly and rotated forwardly and backwardly between a closing position wherein the brew chamber moves upwardly and an opening position wherein the brew chamber is inclined forwardly, the brew chamber supplying the liquid supplied from the temperature conversion tank to the cartridge and brewing the beverage therefrom; and a water pump moving the liquid stored in the temperature conversion tank to the brew chamber, wherein the brew chamber includes: a chamber body fixed to an external casing of the beverage machine and having a water inlet nozzle mounted at the inside; a container movable upwardly and downwardly and rotatable forwardly and backwardly within a given range with respect to the chamber body; and a lever rotatably mounted with respect to the chamber body in such a manner as to be moved manually and connecting the container and the chamber body with each other to allow the container to be moved upwardly and downwardly and rotated forwardly and backwardly within the given range.

According to the present invention, desirably, the beverage machine further includes: a supply pipe connecting the storage tank and the temperature conversion tank with each other so as to induce the movement of the liquid discharged from the storage tank to the temperature conversion tank; and a water outlet pipe connected to the top end of the temperature conversion tank at one side end thereof and to the brew chamber at the other side end thereof so as to induce the movement of the liquid in the temperature conversion tank to the brew chamber.

According to the present invention, desirably, the lever is rotatable with respect to the chamber body around first shafts.

According to the present invention, desirably, the container is rotatable with respect to the lever around second shafts.

According to the present invention, desirably, the lever is rotatable with respect to the chamber body around first shafts, and the container is rotatable with respect to the lever around second shafts, the second shafts being rotated around the first shafts.

According to the present invention, desirably, the beverage machine further includes: connection means connecting the container to the lever and allowing the container to be rotated between the closing position wherein the container moves upwardly and the opening position wherein the container is inclined forwardly according to the movement of the lever.

According to the present invention, desirably, the connection means include guide protrusions protruding from the chamber body and guide grooves formed on the container so as to insert the guide protrusions thereinto, the guide protrusions being movable along the guide grooves.

According to the present invention, desirably, the beverage machine further includes: an air supply pipe connected to an outlet portion of the water pump at one side end thereof; and an air pump mounted at the other side end of the air supply pipe and discharging high pressure air to the water outlet pipe so as to push the liquid remaining in the water outlet pipe to the outside.

According to the present invention, desirably, the beverage machine further includes: a vent pipe connected to the top end of the temperature conversion tank so as to discharge the expanded liquid or air to the storage tank; a heater heating the liquid stored in the temperature conversion tank; and a temperature sensor mounted on the temperature conversion tank so as to sense the temperature of the liquid stored in the temperature conversion tank.

According to the present invention, desirably, the end of the water outlet pipe inside the temperature conversion tank is located at a lower position by a given height than the end of the vent pipe.

According to the present invention, desirably, the beverage machine further includes: a temperature conversion tank liquid level sensor sensing the level of the liquid stored in the temperature conversion tank; a storage tank liquid level sensor sensing the level of the liquid stored in the storage tank; and a cooling part cooling the liquid stored in the temperature conversion tank.

According to the present invention, desirably, the beverage machine further includes a lever fixing button mounted on the top surface of a cap of the brew chamber in the state where a button spring is inserted into the top surface of the cap, the lever fixing button being contacted with the inner surface of the lever in the state of protruding upwardly so as to fix the lever thereto and prevent the lever from being moved upwardly.

According to the present invention, desirably, the temperature conversion tank is located at a height lower than the bottom surface of the storage tank.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, a beverage machine with a rotatable brew chamber (hereinafter, referred to simply as a beverage machine) according to the present invention will be in detail explained with reference to the attached drawing.

Figure 1A:
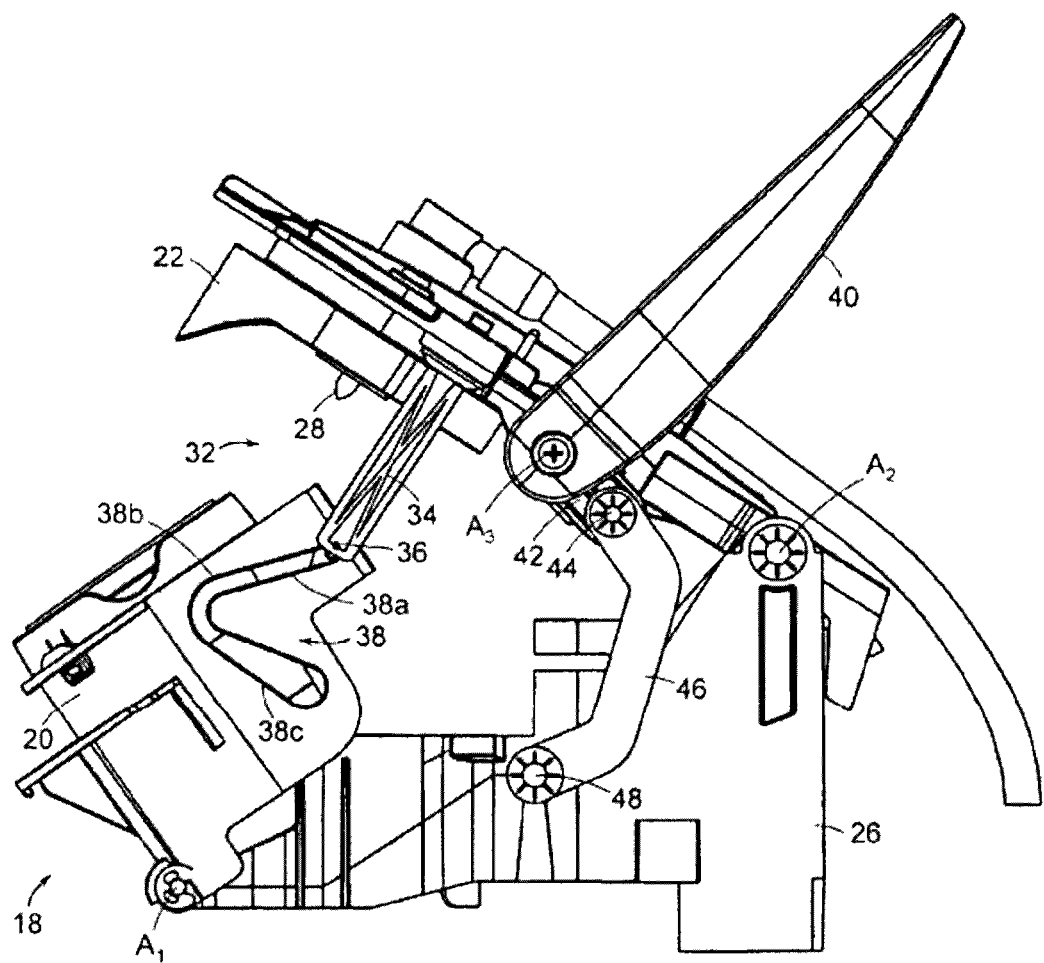
FIGS. 1a to 1d are sectional views showing the procedure for opening/closing a brew chamber of a coffee machine in the conventional practice.
Figure 1B:
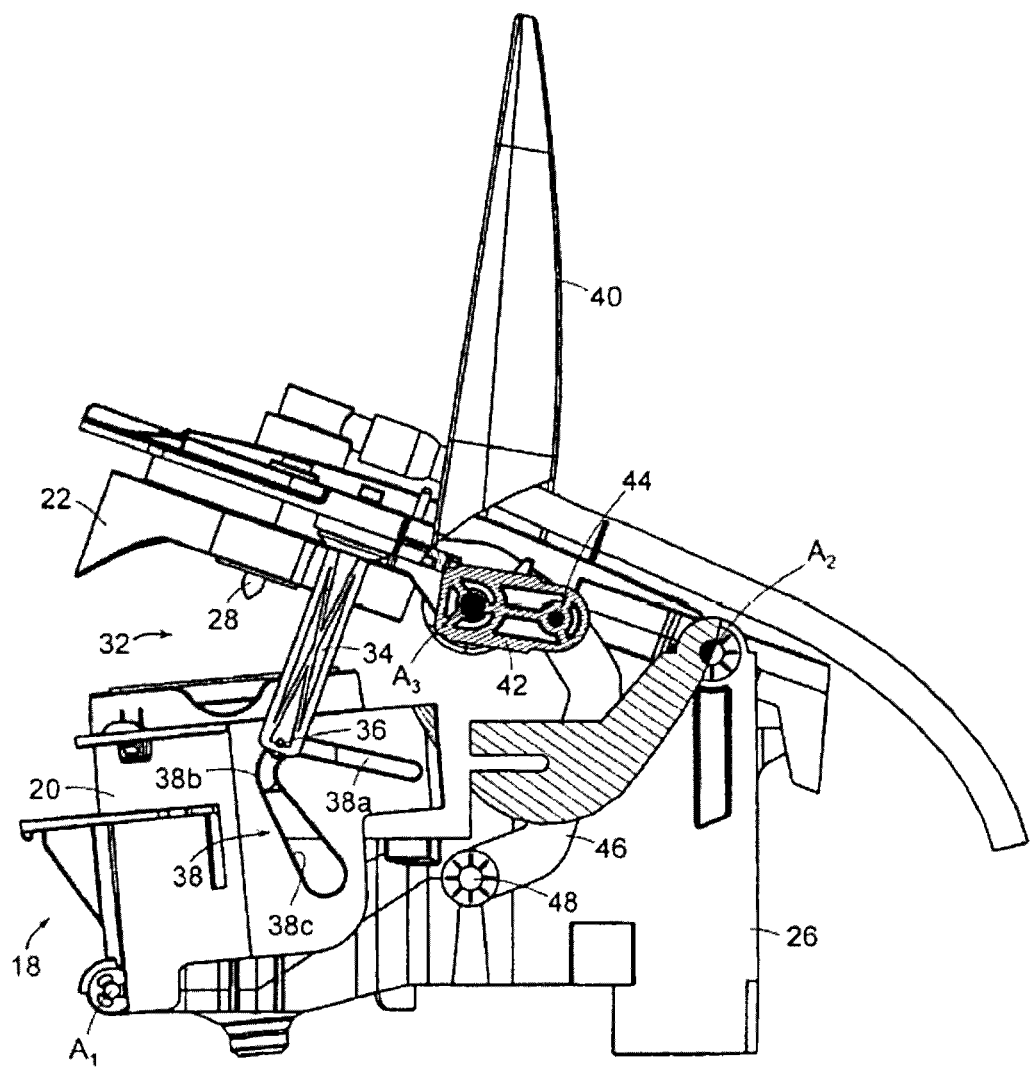
Figure 1C:
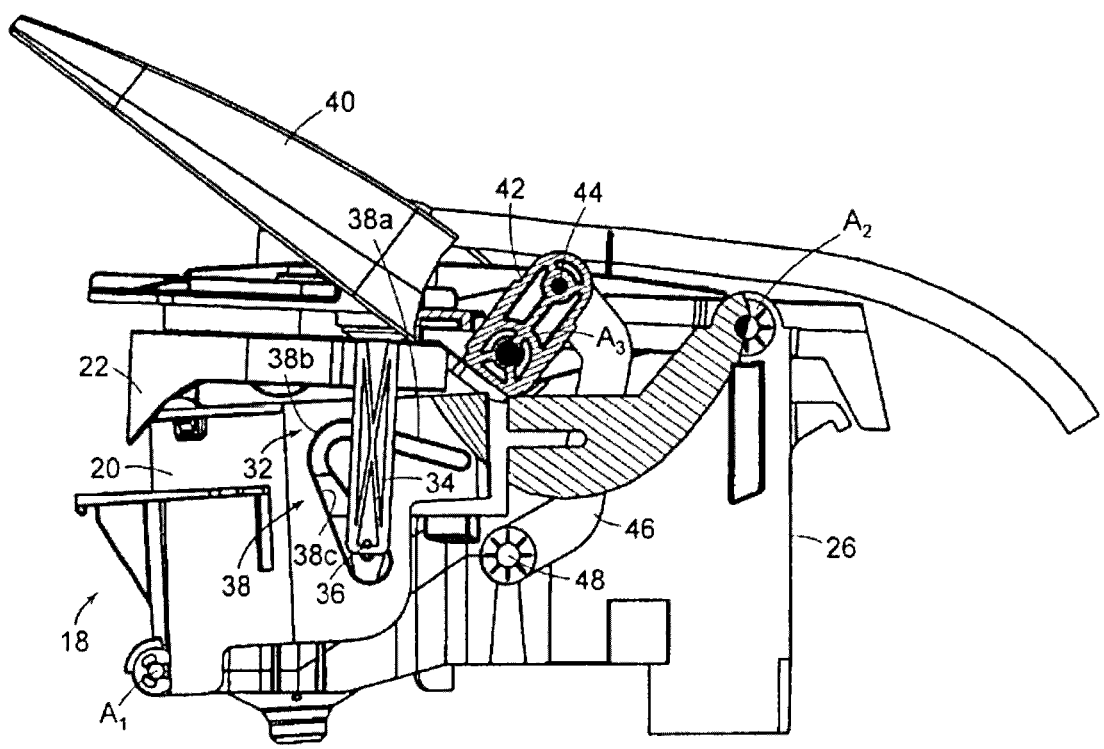
Figure 1D:
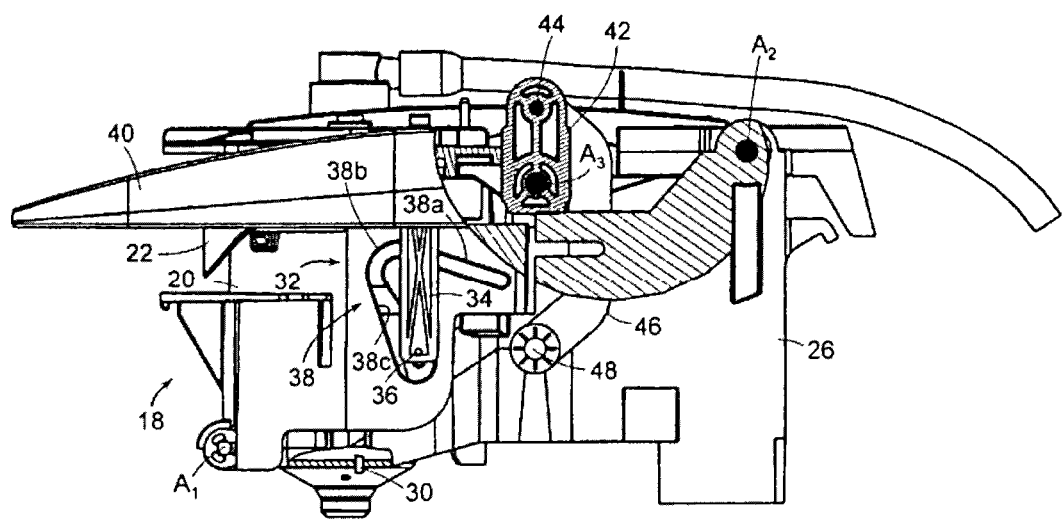
Figure 2:
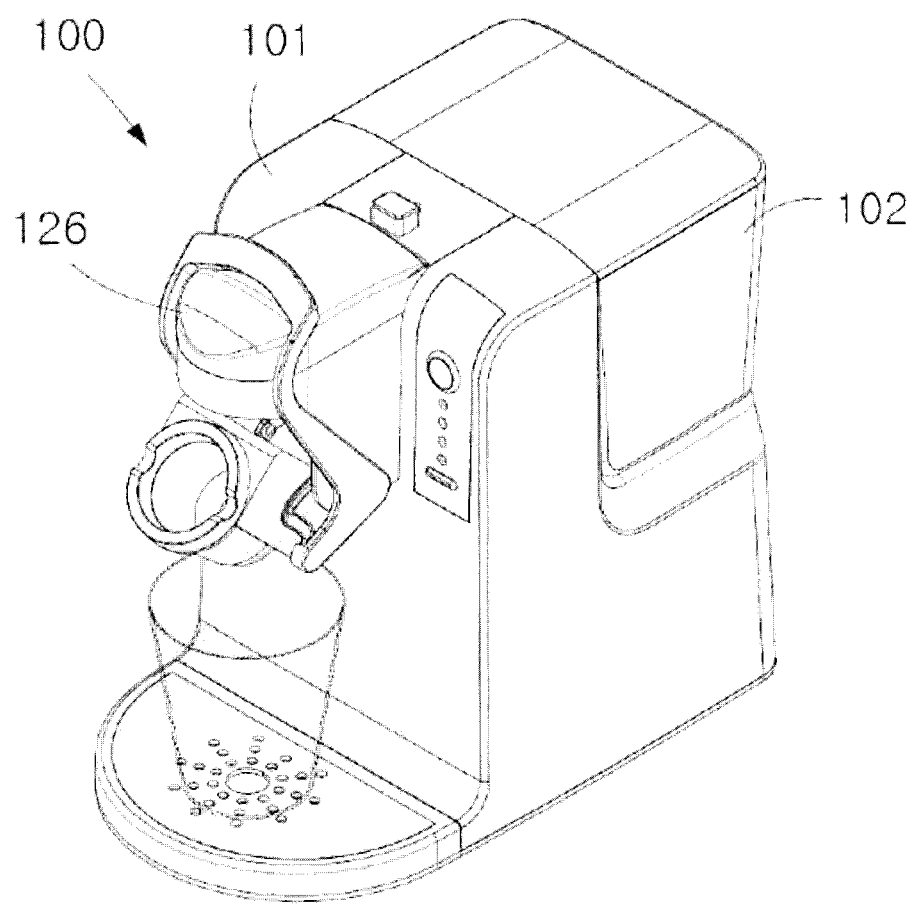
FIG. 2 is a perspective view showing a beverage machine with a rotatable brew chamber according to the present invention.
Figure 3:
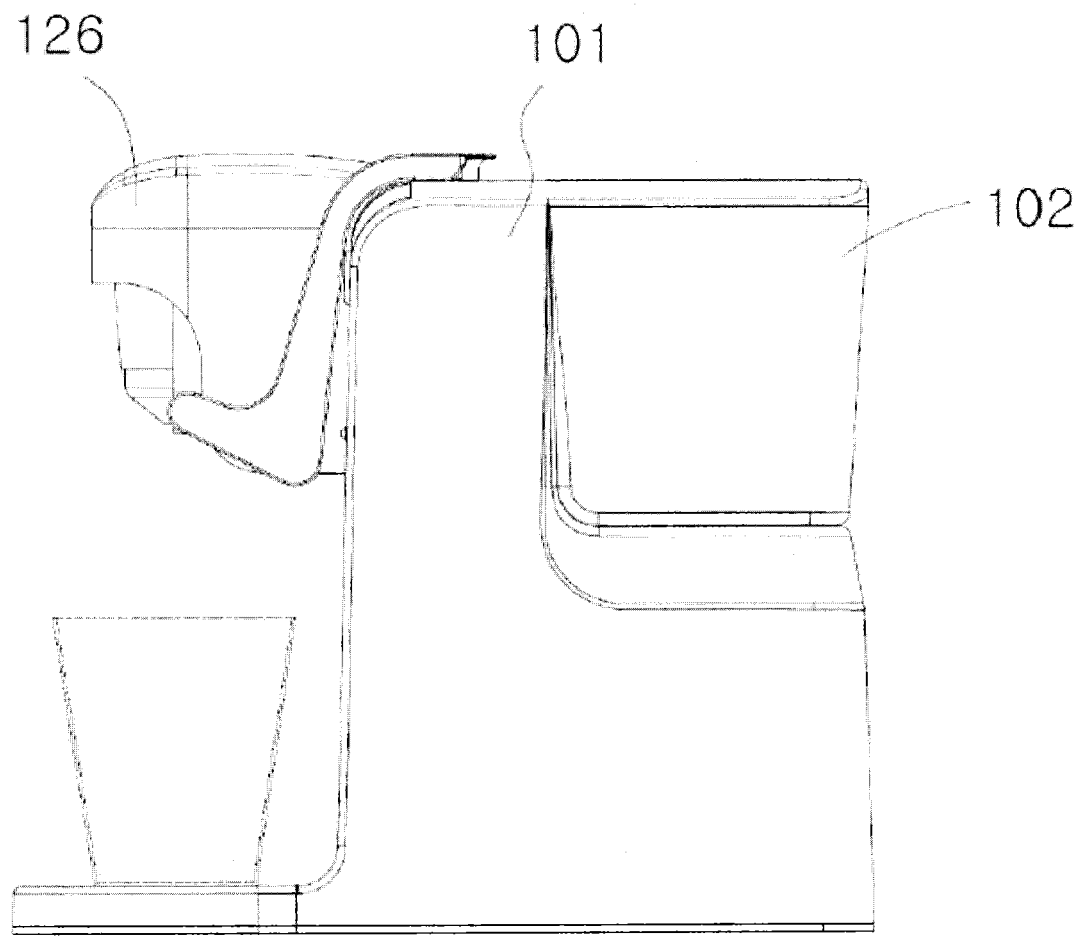
FIG. 3 is a side view showing the beverage machine according to the present invention.

FIG. 2 is a perspective view showing a beverage machine with a rotatable brew chamber according to the present invention, and FIG. 3 is a side view showing the beverage machine according to the present invention.

According to the present invention, the beverage machine 100 is configured wherein a separate cartridge (capsule, pod, pack, etc.) in which a variety of materials (coffee beans, tea leaves, powder milk, cocoa powder, etc.) are contained is mounted thereon, in the similar manner to the conventional practice, and high pressure liquid (hot water, cold water, etc.) is supplied to the cartridge to provide the beverage (coffee, tea, milk, cocoa, etc.) made from the material stored in the cartridge.

The beverage machine 100 has an external casing 101 constituting the outer shape thereof and various water pipe equipment and electric controlling parts mounted inside the external casing 101. Further, a part for mounting a beverage cartridge and a part (a brew chamber 126) for brewing the beverage material are mounted on the upper portion of the front surface of the external casing 101.

Figure 4:
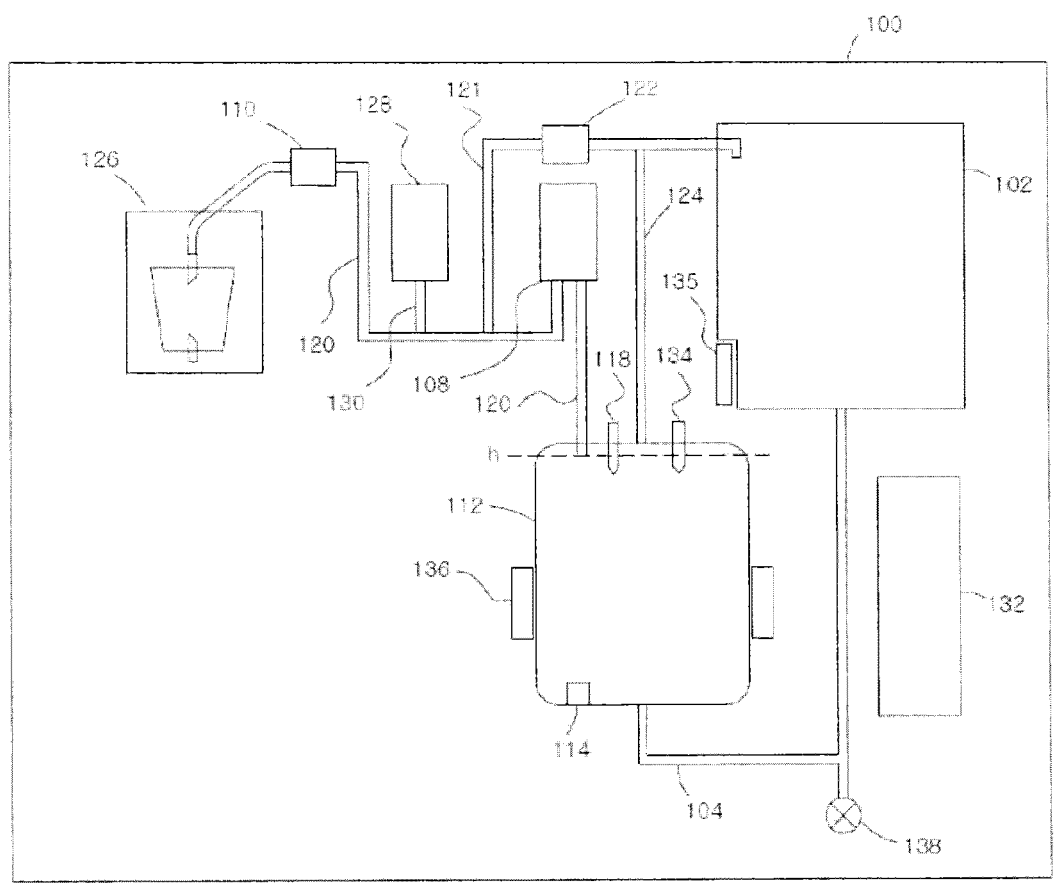
FIG. 4 is a block diagram showing the internal water pipe structure of the beverage machine according to the present invention.

FIG. 4 is a block diagram showing the internal water pipe structure of the beverage machine according to the present invention.

The beverage machine 100 has a storage tank 102 mounted at the inside thereof so as to store liquid for brewing a beverage therein, and the storage tank 102 is connected on the underside thereof to one side end of a supply pipe 104. The other side end of the supply pipe 104 is connected to a temperature conversion tank 112, and the liquid stored in the storage tank 102 is introduced into the temperature conversion tank 112 through the supply pipe 104. The storage tank 102 may be fixedly mounted onto the beverage machine 100, but desirably, it may be detachably mounted thereonto, so that the liquid can be easily refilled in the storage tank 102 by a user. If the storage tank 102 is detachably mounted on the beverage machine 100, it is exposed to the outside of the beverage machine 100, which makes it convenient to use.

The temperature conversion tank 112 stores the liquid supplied from the storage tank 102, while heating or cooling the liquid. The temperature conversion tank 112 is located at a height lower than the bottom surface of the storage tank 102, and when the storage tank 102 is mounted on the beverage machine 100, thus, the liquid of the storage tank 102 is moved to the temperature conversion tank 112 along the supply pipe 104 by means of gravity. While the liquid is being moved to the temperature conversion tank 112, air is escaped from a vent pipe 124 of the temperature conversion tank 112.

A storage tank liquid level sensor 135 is mounted on the storage tank 102 or on the inner wall of the external casing 101 at which the external casing 101 and the storage tank 102 are brought into contact with each other. The storage tank liquid level sensor 135 senses the liquid level of the storage tank 102. The temperature conversion tank 112 is located at a height lower than the bottom surface of the storage tank 102, and therefore, if the liquid exists in the storage tank 102, it may be fully filled in the temperature conversion tank 112.

A temperature conversion tank liquid level sensor 134 is mounted inside the temperature conversion tank 112 and serves as an auxiliary part for sensing whether the liquid is fully filled in the temperature conversion tank 112.

The vent pipe 124 is connected from the top side of the temperature conversion tank 112 to the upper end of the storage tank 102. The vent pipe 124 discharges the steam generated from the high temperature liquid stored in the temperature conversion tank 112 to the storage tank 102 so as to appropriately maintain the internal pressure of the temperature conversion tank 112.

A water outlet pipe 120 is extended downwardly from the top side of the temperature conversion tank 112 to a height h lower than the vent pipe 124 and serves to move the liquid stored in the temperature conversion tank 112 to the brew chamber 126.

A water pump 108 is mounted on a given position of the water outlet pipe 120 and serves to generate the power for moving the liquid from the temperature conversion tank 112 to the brew chamber 126. The water pump 108 is a typical fluid moving pump and has a flow rate capable of maintaining the liquid level in the temperature conversion tank 112 to the height h or more, while a given amount of liquid is being distributed. If the liquid level of the temperature conversion tank 112 is descended to the height h or less during the distribution of the liquid, the water pump 108 absorbs the air from the vent pipe 124.

A check valve 110 is mounted on the water outlet pipe 120 and serves to allow the liquid flowing inside the water outlet pipe 120 to flow only to the brew chamber 126 from the temperature conversion tank 112, while preventing the liquid from reversely flowing from the brew chamber 126 to the temperature conversion tank 112. The check valve 110 may be mounted on any position of the water outlet pipe 120.

A pressure releasing valve 122 serves to release the pressure of the water outlet pipe 120 by means of the operation of the pump if the pressure is raised to a given pressure or more by means of the blocking of the water outlet pipe 120, a water inlet nozzle 126-1a, or a water outlet nozzle 126-5a. The pressure releasing valve 122 is mounted on a bypass pipe 121 connecting the water outlet pipe 120 and the vent pipe 124 with each other.

A heater 114 is mounted inside the temperature conversion tank 112 and serves to generate heat by using the electric current supplied from a power supply part (not shown). The liquid stored in the temperature conversion tank 112 is heated to a high temperature by means of the heat generated from the heater 114.

A temperature sensor 118 is mounted on the external wall of the temperature conversion tank 112 or inside the temperature conversion tank 112 so as to measure the temperature of the liquid stored in the temperature conversion tank 112.

Through the water outlet pipe 120, the liquid is discharged from the temperature conversion tank 112 and supplied to the brew chamber 126.

The beverage machine 100 has the brew chamber 126 in which the cartridge is mounted, and the brew chamber 126 is connected to the other side end of the water outlet pipe 120. The structure and operating principle of the brew chamber 126 will be discussed later.

An air pump 128 is mounted inside the beverage machine 100 so as to discharge high pressure air, and the air pump 128 supplies the high pressure air through an air supply pipe 130. One side end of the air supply pipe 130 is connected to the water pump 108. That is, one side end of the air supply pipe 130 is connected to a close position to the portion where the water outlet pipe 120 is connected to the water pump 108. The high pressure air discharged from the air pump 128 is passed through the air supply pipe 130 and enters the water outlet pipe 120. Accordingly, the liquid remaining inside the water outlet pipe 120 is moved toward the brew chamber 126 by means of the high pressure air.

The temperature conversion tank liquid level sensor 134 is mounted inside the temperature conversion tank 112 so as to measure the level of the liquid stored in the temperature conversion tank 112, and the measured value is transmitted to a controller 132.

A cooling part 136 is additionally mounted or replaced with the heater 114 on the external wall of the temperature conversion tank 112, so as to cool the liquid stored in the temperature conversion tank 112.

A drain valve 138 is mounted on the supply pipe 104 connecting the storage tank 102 and the temperature conversion tank 112 with each other. Through the drain valve 138, the liquid remaining inside the storage tank 102, the supply pipe 104, and the temperature conversion tank 112 is discharged to the outside.

The controller 132 controls the operations of the water pump 108, the heater 114, and the air pump 128 and adjusts the state of the beverage machine 100 on the basis of the measured data transmitted from the temperature sensor 118 and the liquid level sensors 134 and 135.

Figure 5:
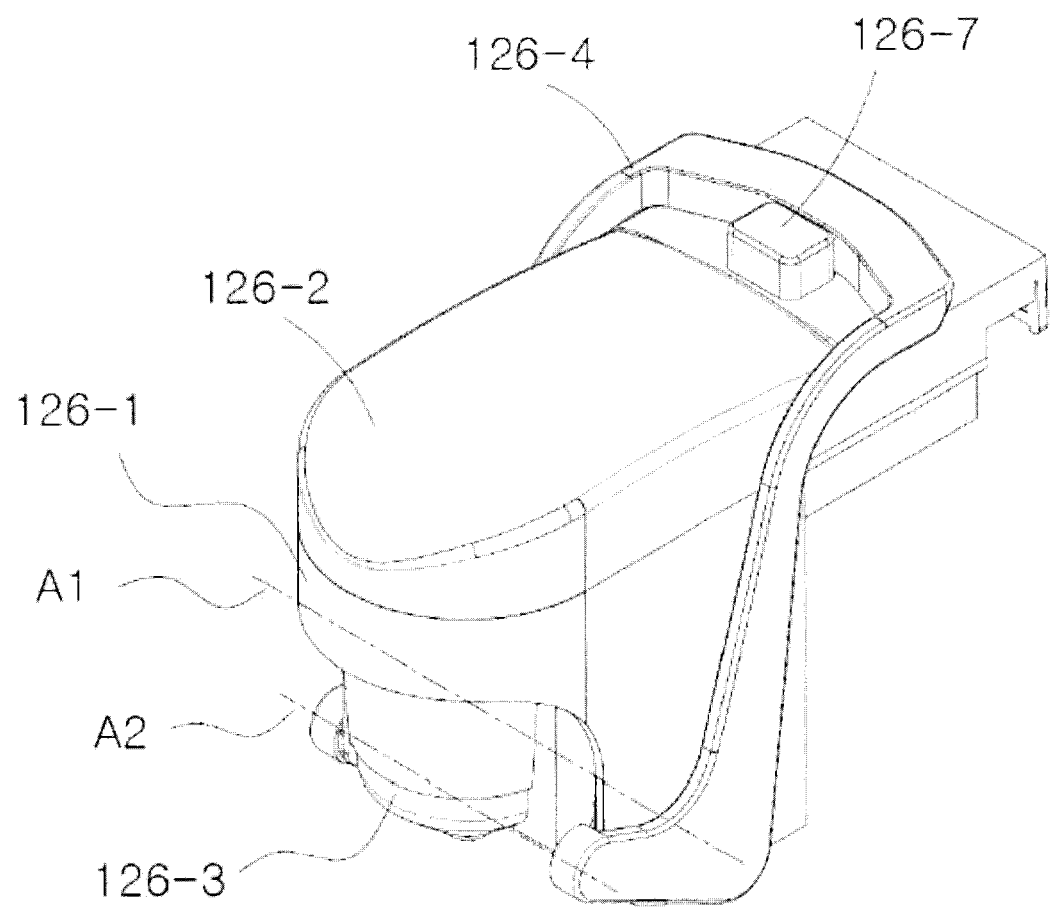
FIG. 5 is a perspective view showing the brew chamber of the beverage machine according to the present invention.
Figure 6:
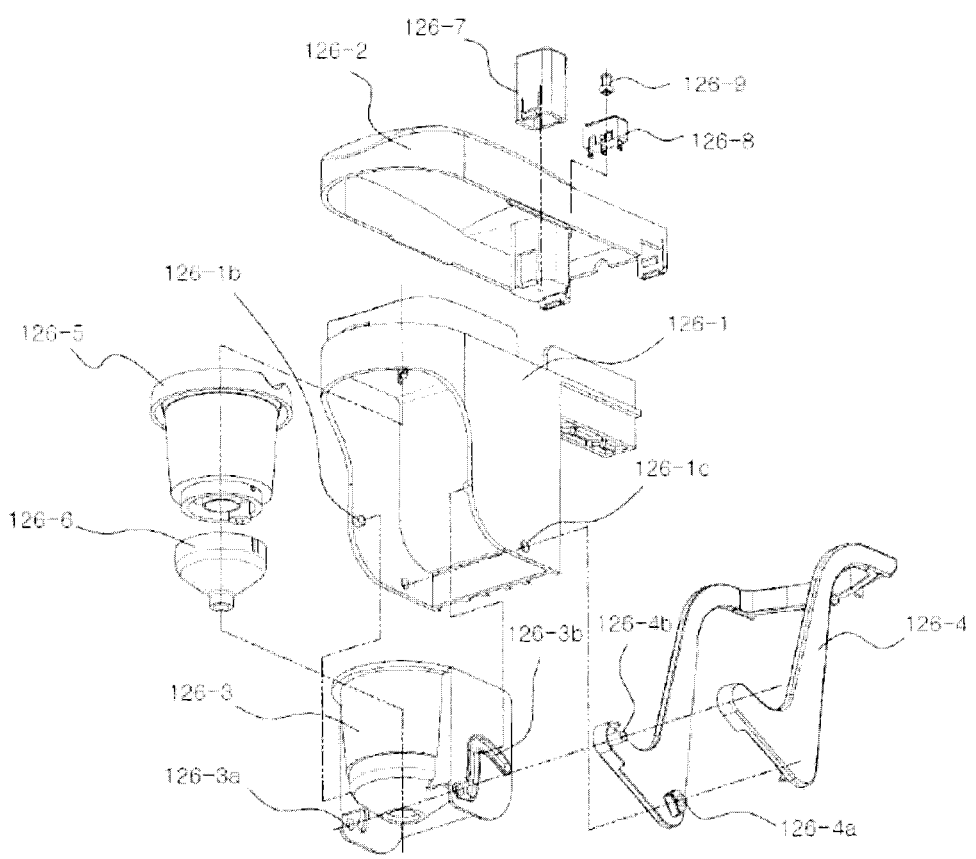
FIG. 6 is an exploded perspective view showing the coupling relation among the parts of the brew chamber in the beverage machine according to the present invention.
Figure 7:
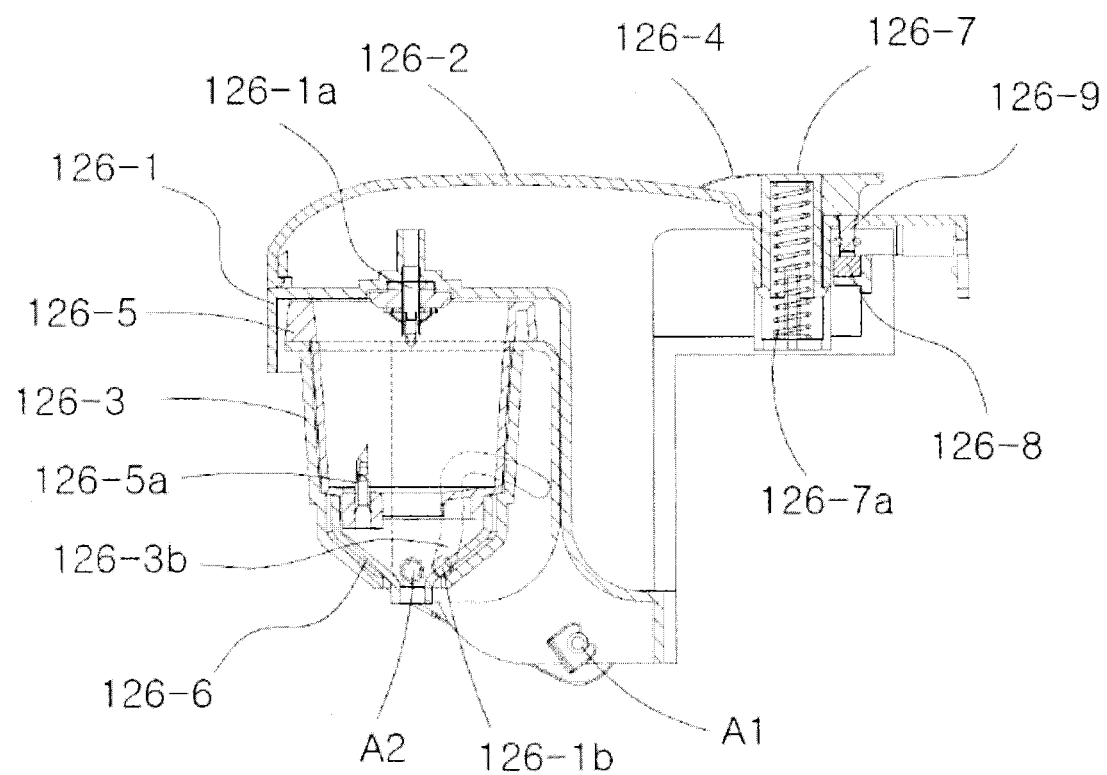
FIG. 7 is a sectional view showing the internal structure of the brew chamber of FIG. 6.

FIG. 5 is a perspective view showing the brew chamber of the beverage machine according to the present invention, FIG. 6 is an exploded perspective view showing the coupling relation among the parts of the brew chamber in the beverage machine according to the present invention, and FIG. 7 is a sectional view showing the internal structure of the brew chamber of FIG. 6.

The brew chamber 126 serves to move the hot water or cool water supplied from the temperature conversion tank 112 to the interior of the cartridge in the state where the beverage cartridge is mounted therein and to discharge the corresponding beverage from the bottom side thereof.

The brew chamber 126 has a chamber body 126-1 fixed to the external casing 101 of the beverage machine 100 and a cap 126-2 for closing the top surface of the chamber body 126-1. The chamber body 126-1 and the cap 126-2 may be injection-molded as a unitary body.

The chamber body 126-1 has the water inlet nozzle 126-1a mounted at the inside thereof in such a manner as to be located downwardly, and the end of the water outlet pipe 120 is connected to the top end of the water inlet nozzle 126-1a, so that the liquid moving from the temperature conversion tank 112 is supplied to the water inlet nozzle 126-1a.

The chamber body 126-1 is open at the front portion thereof in such a manner as to be extended from the left and right sides of the lower portion thereof to the rear wall surface thereof, and further, a container 126-3 is insertedly fixed into the open front portion of the chamber body 126-1 in such a manner as to be upwardly and downwardly movable and rotatable. The container 126-3 has a cylindrical space portion formed at the inside thereof so as to insert a cartridge holder 126-5 thereinto, and further has relatively large square plates integrally formed on both sides of the outer peripheral surface of the cylindrical body thereof. Container rotating grooves 126-3a are formed on the bottom sides of the square plates. Thus, container rotating shafts 126-4b of a lever 126-4 are fitted to the container rotating grooves 126-3a, so that the container 126-3 can be moved upwardly and downwardly, while being rotatable forwardly and backwardly within a given range.

The container 126-3 has generally V-shaped guide grooves 126-3b formed on the left and right side plates thereof. The guide grooves 126-3b form inverted V shapes, so that guide protrusions 126-1b formed on the inside of the left and right wall surfaces of the chamber body 126-1 are inserted into the guide grooves 126-3b. The guide protrusions 126-1b are formed on the chamber body 126-1 not moved and fitted to the guide grooves 126-3b, thus conducting sliding movements, so that the container 126-3 conducts the movements like the shapes of the guide grooves 126-3b in accordance with the motion of the lever 126-4.

The lever 126-4 has a shape of generally inverted U, while having arms extended forwardly from the ends of the lower portion thereof. The lever 126-4 has lever rotating shafts 126-4a formed on the inside of the ends of the lower portion of the inverted U in such a manner as to be fitted to grooves 126-1c formed on the lower portions of the left and right sides of the chamber body 126-1. Accordingly, the lever 126-4 is rotatable forwardly and backwardly within the given range with respect to the chamber body 126-1.

The container rotating shafts 126-4b are formed on the ends of the arms extended forwardly from the ends of the inverted U, and accordingly, they are rotatably inserted into the container rotating grooves 126-3a.

The cartridge holder 126-5 is detachably inserted into the container 126-3 and has a water outlet nozzle 126-5a protruding from the inner bottom surface thereof. The water outlet nozzle 126-5a has a sharp top end portion like the bottom portion of the water inlet nozzle 126-1, so as to pierce the underside of the cartridge. That is, in the state where the cartridge is put into the brew chamber 126, if the lever 126-4 is moved up, the top surface of the container 126-3 comes into close contact with the underside of the chamber body 126-1, and accordingly, the water inlet nozzle 126-1a and the water outlet nozzle 126-5a pierce the top and underside of the cartridge at the same time and put thereinto.

The liquid discharged through the water inlet nozzle 126-1a is passed through the cartridge and becomes a beverage, and the beverage is discharged through the water outlet nozzle 126-5a connected to the underside of the cartridge to the outside.

The beverage discharged through the water outlet nozzle 126-5a is passed through a beverage outlet portion 126-6 mounted on the underside of the cartridge holder 126-5 and moved to a user's cup.

On the other hand, a lever fixing button 126-7 serves to prevent the lever 126-4 from being easily open. The lever fixing button 126-7 is mounted on the top surface of the cap 126-2, in the state where a button spring 126-7a is inserted into the top surface of the cap 126-2. The lever fixing button 126-7 is movable upwardly and downwardly, and in normal states, it is maintained in the state of protruding upwardly by means of the elastic force of the button spring 126-7a.

If the lever 126-4 is moved up to a maximum degree, the lever fixing button 126-7 is contacted with the inner surface of the lever 126-4, so that the lever 126-4 is not moved upwardly anymore. In this state, if it is desired to open the lever 126-4, the lever fixing button 126-7 is pressed by the user so as to release the friction with the lever 126-4. That is, the closing state of the container 126-3 is maintained by means of the lever fixing button 126-7.

Hereinafter, the operation of the brew chamber 126 will be in detail explained with reference to FIGS. 8 and 9.

Figure 8:
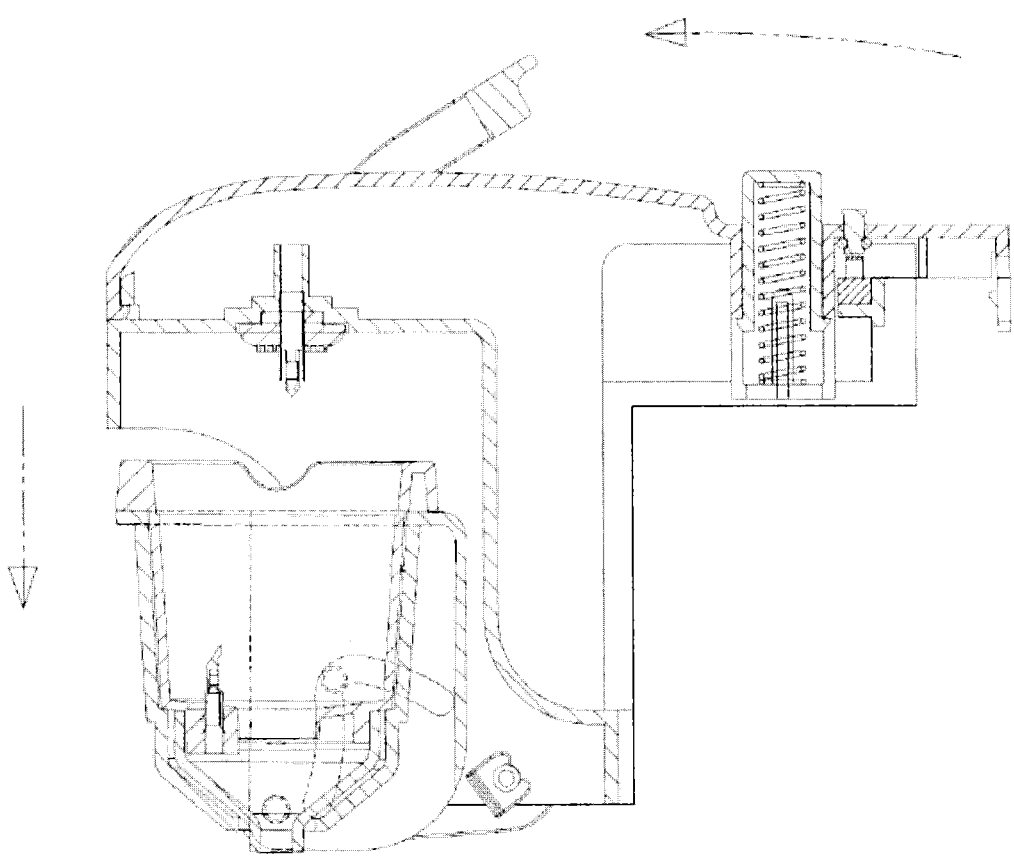
FIG. 8 is a sectional view showing the structure of the brew chamber wherein a lever is moved down to a half degree.
Figure 9:
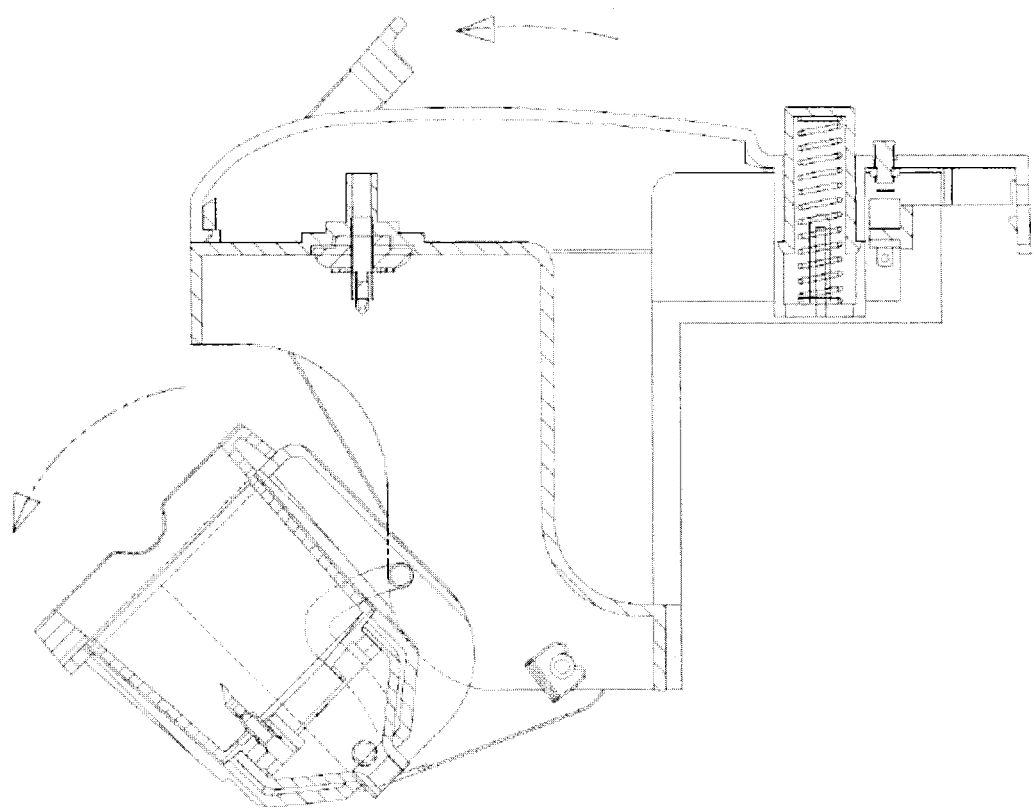
FIG. 9 is a sectional view showing the structure of the brew chamber wherein the lever is moved down to a full degree.

FIG. 8 is a sectional view showing the structure of the brew chamber wherein a lever is moved down to a half degree, and FIG. 9 is a sectional view showing the structure of the brew chamber wherein the lever is moved down to a full degree.

So as to mount the cartridge into the brew chamber 126, the open top surface of the container 126-3 should be exposed to the outside, and thus, the lever 126-4 pulls forwardly. The lever 126-4 is rotatably moved forwardly around the lever rotating shafts 126-4*a*.

In the state wherein the lever 126-4 completely pulls to a closing position, the guide protrusions 126-1*b* are located at the bottommost portions of the guide grooves 126-3*b*. In this state, if the lever 126-4 pulls forwardly to a half degree, it is rotated forwardly, so that the container 126-3 connected to the container rotating grooves 126-3*a* is somewhat moved down by means of the rotating operation of the lever 126-4. The half of each guide groove 126-3*b* is formed vertically, and accordingly, the container 126-3 is moved down vertically like the guide grooves 126-3*b*. At this time, the container 126-3 is maintained to almost vertical state with respect to the ground.

In the state where the lever 126-4 pulls to a half degree, the guide protrusions 126-1*b* are moved upwardly up to the intermediate portions (the portions bent to V) of the guide grooves 126-3*b*.

Next, the lever 126-4 is completely moved down as shown in FIG. 9.

If the lever 126-4 pulls forwardly furthermore by means of the user, the guide protrusions 126-1*b* are passed through the intermediate portions bent to the shape of V of the guide grooves 126-3*b* and enter the paths slantly moving downwardly toward the ground. Next, the ends of the extended portions of the shape of U of the lever 126-4 are moved downwardly, and the container 126-3 is moved furthermore downwardly. Further, the container 126-3 on which the guide grooves 126-3*b* are formed is rotated forwardly and inclined by means of the variation of the positions of the guide protrusions 126-1*b* fixed thereto. That is, the container 126-3 is rotated forwardly and inclined around the container rotating grooves 126-3*a*.

If the lever 126-4 completely pulls, the guide protrusions 126-1*b* are moved to the ends of the guide grooves 126-3*b* and stop thereat. At this time, the container 126-3 is in a state of being completely forwardly inclined open.

The cartridge (being mounted in the cartridge holder 126-5) is inserted into the container 126-3 through the open top portion of the container 126-3.

Next, if the lever 126-4 pushes upwardly again, it moves upwardly in the reverse order to the above-mentioned order, so that the container 126-3 comes into close contact with the underside of the chamber body 126-1.

A switch 126-8 is fixed to the chamber body 126-1 so as to sense the safe closing of the brew chamber 126. When the lever 126-4 comes into close contact with the cap 126-2 to allow the brew chamber 126 to be closed, the switch 126-8 is operated by means of a switch button 126-9 mounted on the cap 126-2.

Figure 10:
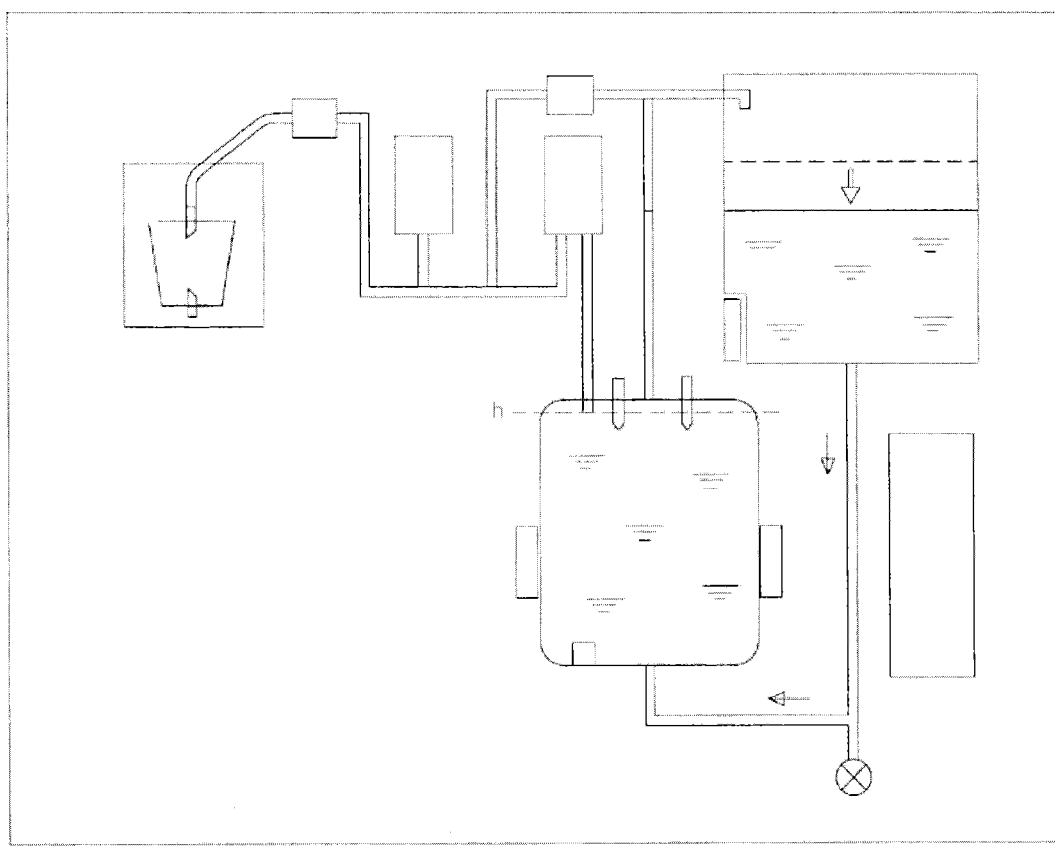
FIG. 10 is a block diagram showing the process wherein liquid is initially supplied from a storage tank to a temperature conversion tank.
Figure 11:
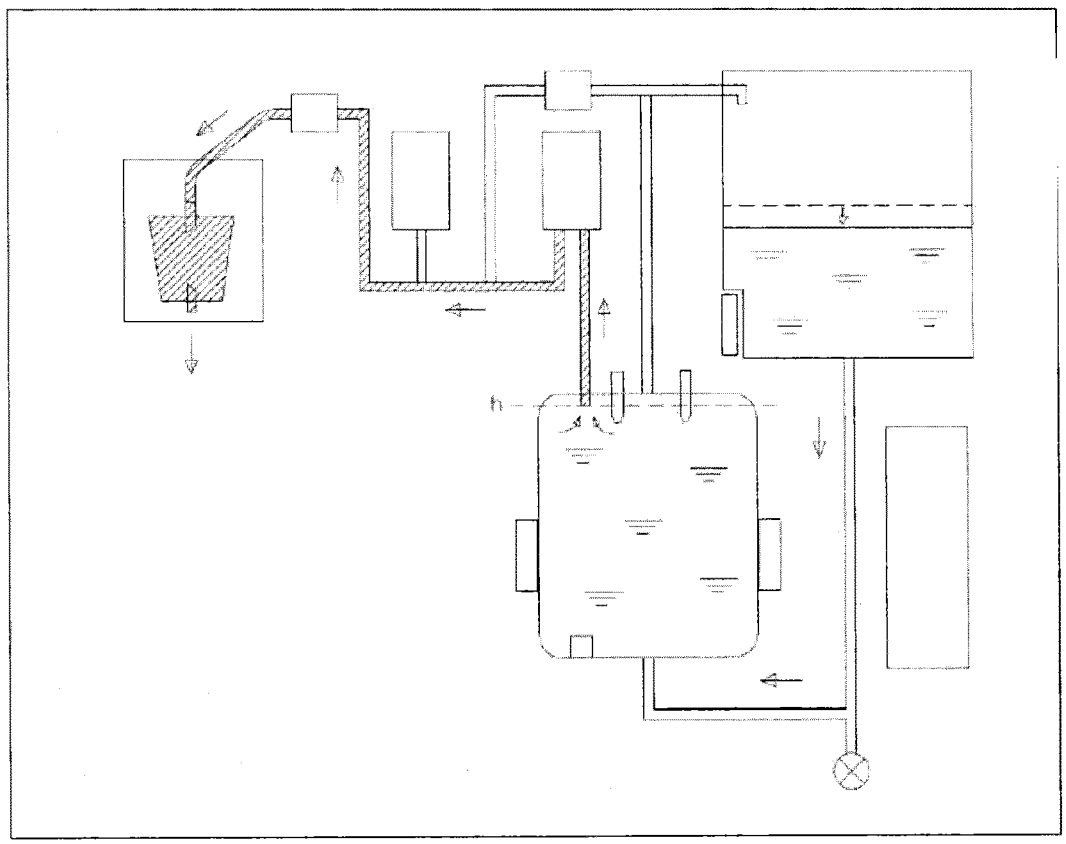
FIG. 11 is a block diagram showing the process wherein the liquid is supplied from the temperature conversion tank to the brew chamber.
Figure 12:
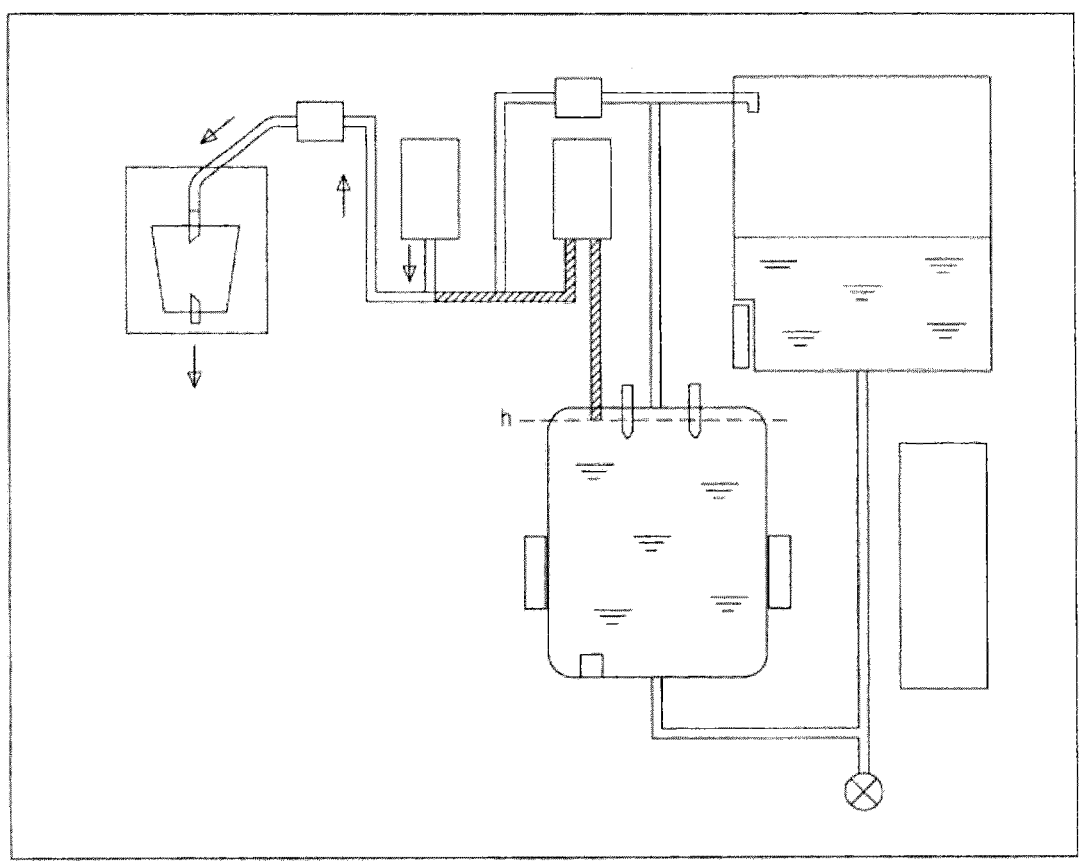
FIG. 12 is a block diagram showing the process wherein the liquid in a water outlet pipe is removed through the operation of an air pump.

On the other hand, FIG. 10 is a block diagram showing the process wherein liquid is initially supplied from a storage tank to a temperature conversion tank, FIG. 11 is a block diagram showing the process wherein the liquid is supplied from the temperature conversion tank to the brew chamber, and FIG. 12 is a block diagram showing the process wherein the liquid in a water outlet pipe is removed through the operation of an air pump.

If the beverage machine 100 is used initially or again after kept for a long period of time, no liquid exists therein. In this state, liquid is filled in the storage tank 102, and if the storage tank 102 is mounted onto the beverage machine 100, the liquid should be supplied to the temperature conversion tank 112 and stored therein. Since the temperature conversion tank 112 is located at a height lower than the bottom surface of the storage tank 102, the liquid of the storage tank 102 is moved to the temperature conversion tank 112 by means of gravity and filled therein. The flow rate of the liquid in the supply pipe 104 moving from the storage tank 102 to the temperature conversion tank 112 is varied in accordance with the liquid level difference between the storage tank 102 and the temperature conversion tank 112 and the inner diameter of the supply pipe 104.

While the liquid is being moved from the storage tank 102 to the temperature conversion tank 112, the air in the temperature conversion tank 112 is discharged through the vent pipe 124.

If the movement of the liquid is finished, the liquid is filled by a given amount in the storage tank 102 and fully filled in the temperature conversion tank 112.

If a start switch is pressed by the user after the cartridge is mounted, as shown in FIG. 11, the water pump 108 is operated by means of the controller 132. Accordingly, the liquid stored in the temperature conversion tank 112 is supplied to the brew chamber 126 through the water outlet pipe 120. At the same time, since the liquid is supplied from the storage tank 102 to the temperature conversion tank 112, the level of the liquid stored in the storage tank 102 becomes lowered. However, the liquid is supplied again to the temperature conversion tank 112 by means of gravity, the liquid stored in the temperature conversion tank 112 is maintained to a higher level than the height h by means of the relations between the water outlet flow rate of the water pump 108 and the supply flow rate to the temperature conversion tank 112.

If the liquid is supplied to the brew chamber 126 by a fixed amount, the operation of the water pump 108 stops by means of the controller 132. Accordingly, the liquid is not supplied anymore to the brew chamber 126, but a given amount of liquid (residual water) remains in the water outlet pipe 120.

The amount of liquid supplied from the water outlet pipe 120 to the brew chamber 126 is adjustable by means of the control of the moving time of the liquid. That is, the operating time of the water pump 108 is adjusted by means of the controller 132, thus adjusting the amount of liquid to be supplied. Generally, the water pump 108 supplies the same amount of liquid per unit time, so that the fixed amount of liquid can be accurately supplied through the control of time.

If the supply of the liquid to the brew chamber 126 is finished, as shown in FIG. 12, the air pump 128 is operated by means of the controller 132 in the state where the water pump 108 stops.

The air pump 128 injects the high pressure air to the interior of the water outlet pipe 120 through the air supply pipe 130. The liquid remaining in the water outlet pipe 120 is moved to the brew chamber 126 by means of the injected high pressure air. Accordingly, the water outlet pipe 120 becomes empty.

The liquid (residual water) pushed by means of the high pressure air may be moved toward the temperature conversion tank 112, but the reverse flowing of the liquid is prevented by means of the diaphragm water pump 108, so that the liquid (residual water) pushed by means of the high pressure air is not moved toward the temperature conversion tank 112. Accordingly, most of liquid is moved toward the brew chamber 126.

If a new beverage cartridge is mounted, liquid is supplied in the same manner as mentioned above.

As mentioned above, the chamber body having the sharp water inlet nozzle is fixed to the external casing of the beverage machine, and even if the brew chamber is open, no dangerous element is exposed to the outside.

Further, the brew chamber can be open or closed by means of one time operation of the lever, thus allowing the cartridge to be easily detachably mounted therein.

Furthermore, the liquid is completely removed from the water outlet pipe, thus preventing the residual water after the water supply from being dropped.

Additionally, the liquid stored in the storage tank is moved to the temperature conversion tank by means of gravity, and accordingly, the level of the liquid stored in the temperature conversion tank can be controlled, without having any level sensor on the temperature conversion tank.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A beverage machine for brewing a beverage by supplying liquid to a cartridge in which a material for the beverage is contained, the beverage machine comprising:
    a storage tank storing the liquid therein;
    a temperature conversion tank storing the liquid supplied from the storage tank therein;
    a brew chamber mounting the cartridge thereinto and moved upwardly and downwardly and rotated forwardly and backwardly between a closing position wherein the brew chamber moves upwardly and an opening position wherein the brew chamber is inclined forwardly, the brew chamber supplying the liquid supplied from the temperature conversion tank to the cartridge and brewing the beverage therefrom; and
    a water pump moving the liquid stored in the temperature conversion tank to the brew chamber,
    wherein the brew chamber comprises:
    a chamber body fixed to an external casing of the beverage machine and having a water inlet nozzle mounted at an upper inside, wherein the water inlet nozzle is mounted protruding downwardly as the chamber body is open forwardly;
    a container movable upwardly and downwardly and rotatable forwardly and backwardly within a given range with respect to the chamber body by a connecting means;
    a lever rotatably mounted with respect to the chamber body in such a manner as to be moved manually and connecting the container and the chamber body with each other to allow the container to be moved upwardly and downwardly and rotated forwardly and backwardly within the given range,
    wherein the lever is rotatable with respect to the chamber body around a first axis located at a middle portion of the lever,
    wherein the container is rotatable with respect to the lever around a second axis located at an end portion of the lever;
    guide protrusions and guide grooves comprised of the connecting means, the guide protrusions protruding from any one of the chamber body and the container which are inserted into the guide grooves formed on the other one of the chamber body and the container, the guide protrusions being movable along the guide grooves by rotation of the lever;
    a rotational section defining that the container is rotated based on the guide protrusion by the rotation of the lever so that an upper portion of the container faces the water inlet nozzle, and an upward and downward movement section defining that the second axis is moved upwardly and downwardly based on the guide protrusions being movable along the guide grooves so that an upward and downward movements of the second axis define a closing and opening positions of the container; and
    a lever fixing button mounted on the top surface of a cap of the brew chamber where a button spring is inserted into the top surface of the cap, the lever fixing button being contacted with the inner surface of the lever in an upwardly protruding manner so as to fix the lever thereto and prevent the lever from being moved upwardly,
    wherein the container moves from the opening position to the closing position as the container continues to move the rotational section and the upward and downward movement sections.

2. The beverage machine according to claim 1, further comprising:
    a supply pipe connecting the storage tank and the temperature conversion tank with each other so as to induce the movement of the liquid discharged from the storage tank to the temperature conversion tank; and
    a water outlet pipe connected to the top end of the temperature conversion tank at one side end thereof and to the brew chamber at the other side end thereof so as to induce the movement of the liquid in the temperature conversion tank to the brew chamber.

3. The beverage machine according to claim 1, wherein the container is connected to the lever by the guide protrusions being inserted into the guide grooves.

4. The beverage machine according to claim 2, further comprising:
    an air supply pipe connected to an outlet portion of the water pump at one side end thereof; and
    an air pump mounted at the other side end of the air supply pipe and discharging high pressure air to the water outlet pipe so as to push the liquid remaining in the water outlet pipe to the outside.

5. The beverage machine according to claim 2, further comprising:
    a vent pipe connected to the top end of the temperature conversion tank so as to discharge the expanded liquid or air;
    a heater heating the liquid stored in the temperature conversion tank; and
    a temperature sensor mounted on the temperature conversion tank so as to sense the temperature of the liquid stored in the temperature conversion tank.

6. The beverage machine according to claim 5, wherein the end of the water outlet pipe inside the temperature conversion tank is located at a lower position by a given height h than the end of the vent pipe.

7. The beverage machine according to claim 2, further comprising:
    a temperature conversion tank liquid level sensor sensing the level of the liquid stored in the temperature conversion tank; and
    a storage tank liquid level sensor sensing the level of the liquid stored in the storage tank.

8. The beverage machine according to claim 1, wherein the temperature conversion tank is located at a height lower than the bottom surface of the storage tank.

9. The beverage machine according to claim 1, wherein the container is rotatable with respect to the lever around a second axis.

10. The beverage machine according to claim 5, further comprising:
- a temperature conversion tank liquid level sensor sensing the level of the liquid stored in the temperature conversion tank; and
- a storage tank liquid level sensor sensing the level of the liquid stored in the storage tank.

* * * * *